(12) United States Patent
Champion et al.

(10) Patent No.: US 7,949,938 B2
(45) Date of Patent: May 24, 2011

(54) COMPARING AND MERGING MULTIPLE DOCUMENTS

(75) Inventors: David Frederick Champion, Durham, NC (US); Timothy Andreas Meserth, Durham, NC (US); Patrick Gabor Nyeste, Raleigh, NC (US); Jeffrey John Smith, Raleigh, NC (US); David Thomas Windell, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 784 days.

(21) Appl. No.: 11/688,796

(22) Filed: Mar. 20, 2007

(65) Prior Publication Data
US 2008/0235579 A1 Sep. 25, 2008

(51) Int. Cl.
*G06F 17/00* (2006.01)
(52) U.S. Cl. ........ 715/229; 715/209; 715/212; 715/230; 715/232; 715/255; 715/256; 715/273; 715/277; 707/203
(58) Field of Classification Search .................. 715/209, 715/212, 229, 230, 232, 255, 256, 273, 277; 707/203
See application file for complete search history.

(56) References Cited

U.S. PATENT DOCUMENTS

| | | | |
|---|---|---|---|
| 5,220,657 A | | 6/1993 | Bly et al. |
| 5,671,428 A | * | 9/1997 | Muranaga et al. ............ 715/751 |
| 5,806,078 A | * | 9/1998 | Hug et al. ...................... 715/205 |
| 5,828,885 A | | 10/1998 | Raman |
| 5,890,177 A | * | 3/1999 | Moody et al. ................. 715/210 |
| 6,055,551 A | | 4/2000 | Heinlein et al. |
| 6,240,414 B1 | * | 5/2001 | Beizer et al. ...................... 707/8 |
| 6,341,291 B1 | | 1/2002 | Bentley et al. |
| 6,658,626 B1 | * | 12/2003 | Aiken ............................ 715/205 |
| 7,028,019 B2 | * | 4/2006 | McMillan et al. ............. 707/691 |
| 7,131,112 B1 | | 10/2006 | Bartz et al. |
| 7,260,773 B2 | * | 8/2007 | Zernik ........................... 715/229 |
| 7,590,933 B2 | * | 9/2009 | Letkeman et al. ............. 715/230 |
| 7,653,613 B1 | * | 1/2010 | DeGraaff et al. ..................... 1/1 |
| 2002/0010743 A1 | * | 1/2002 | Ryan et al. ..................... 709/205 |
| 2003/0001891 A1 | * | 1/2003 | Keohane et al. .............. 345/754 |
| 2004/0093564 A1 | | 5/2004 | Kumhyr et al. |
| 2004/0177343 A1 | * | 9/2004 | McVoy et al. ................. 717/122 |

(Continued)

OTHER PUBLICATIONS

M.D. Stone, "Comparing Documents in Microsoft Word", PCMag.com, May 18, 2005, pp. 1-2 [online] [retrieved Jan. 22, 2007] http://www.pcmag.com/print_article2/0,1217,a=152621,00.asp.

(Continued)

*Primary Examiner* — Stephen S Hong
*Assistant Examiner* — I-Chan Yang
(74) *Attorney, Agent, or Firm* — Konrad Raynes and Victor LLP; David W. Victor (57) ABSTRACT

Provided are a method, system, and article of manufacture for comparing and merging multiple merge documents, wherein each merge document includes content element locations having user content or empty. A determination is made in the determined merge documents of content element locations in at least two of the merge documents having a same content and content element locations in at least two of the determined merge documents having different content. An aggregate document is generated including content element locations corresponding to the content element locations in the determined merge documents. A content graphical indicator is rendered with content element locations in the aggregate document for which at least two of the determined merge documents provide different content, and information is rendered in response to user selection for the content in the plurality of the merge documents provided for the selected content element location.

21 Claims, 11 Drawing Sheets

U.S. PATENT DOCUMENTS

2005/0060342 A1    3/2005   Farag
2005/0138540 A1*   6/2005   Baltus et al. .................. 715/511
2006/0161516 A1*   7/2006   Clarke et al. ....................... 707/2
2006/0167946 A1    7/2006   Hellman et al.
2007/0260996 A1*  11/2007   Jakobson ..................... 715/781
2007/0283321 A1*  12/2007   Hegde et al. .................. 717/110

OTHER PUBLICATIONS

C. Thomas, "Word Compare and Merge Documents", TechTrax, pp. 1-4, [online] [retrieved Jan. 29, 2007] http://pubs.logicalexpressions.com/pub/0009/LPMArticle.asp?ID=647.

* cited by examiner

Content Element Location Information

| | A | B | C | D | E | F | G | H |
|---|---|---|---|---|---|---|---|---|
| 1 | Performance Evaluation | | | | | | | |
| 2 | Product | A | B | C | D | | | |
| 3 | Ease of Use | | 5 | 3 | 10 | 7 | | |
| 4 | Accessibility | | 6 | 3 | 5 | 7.0 PN | | |
| 5 | Serviceability | | 0.4 | 0.4 | 0.2 | 8.5 ER | | |
| 6 | Appearance | | 6 | 8 | 3 | 8.1 JS | | |
| 7 | Critical Fixes | | 0 | 4 | 0 | | | |
| 8 | Overall (not a composite) | | 7 | 4.3 | 8.2 | | Jeffrey Smith comment: I got an 8.1. Remember the assistance necessary for servicing OOB defects. | |
| 9 | | | | | | 8.2 LG | | |
| 10 | | | | | | | | |
| 11 | | | | | | 8.2 MN | | |
| 12 | | | | | | | | |
| 13 | | | | | | 8.2 KL | | |
| 14 | | | | | | | | |
| 15 | | | | | | | | |
| 16 | | | | | | | | |
| 17 | | | | | | | | |

COMPARING AND MERGING MULTIPLE DOCUMENTS

BACKGROUND OF THE INVENTION

1. Field of the Invention

The present invention relates to a method, system, and article of manufacture for comparing and merging multiple documents.

2. Description of the Related Art

Many document processing and editing programs provide a compare feature to allow an author to compare a previous version of a document with a current version of the document opened in the document processing program, such as a word processor, spreadsheet program, etc. Certain document editing programs allow the user to view differences between two documents and select the content to use, i.e., the content from the currently opened document or the content of the selected document compared with the currently opened document. After accepting or rejecting modifications to the base document from the compared document, the user may then save the merged or aggregate document produced using this comparison operation as a new version of the previously opened version of the document.

In certain group editing environments, authors may check out a version of a master document and then modify that document. A master author, usually the one that controls the master document, may review the modifications to the master document in the separate author documents and select differences from the separate author documents to include in a new version of the master document.

There is a need in the art for improved techniques for comparing and merging documents.

SUMMARY

Provided are a method, system, and article of manufacture for comparing and merging multiple documents. A determination is made of a plurality of merge documents to merge, wherein each merge document includes content element locations, wherein content in the content element locations comprises user content or indication that the content element location is empty. A determination is made for each content element location in the determined merge documents content element locations in the merge documents having a same content and content element locations in at one of the determined merge documents having different content than the other determined merge documents. An aggregate document is generated including content element locations corresponding to the content element locations in the determined merge documents. A content graphical indicator is rendered with content element locations in the aggregate document for which at least one of the determined merge documents provide different content. User selection is received of one content element location for which the graphical indicator is rendered. Information is rendered for the content in the plurality of the merge documents provided for the selected content element location, wherein at least one of the merge documents provide different content for the selected content element location.

DETAILED DESCRIPTION

Figure 1:
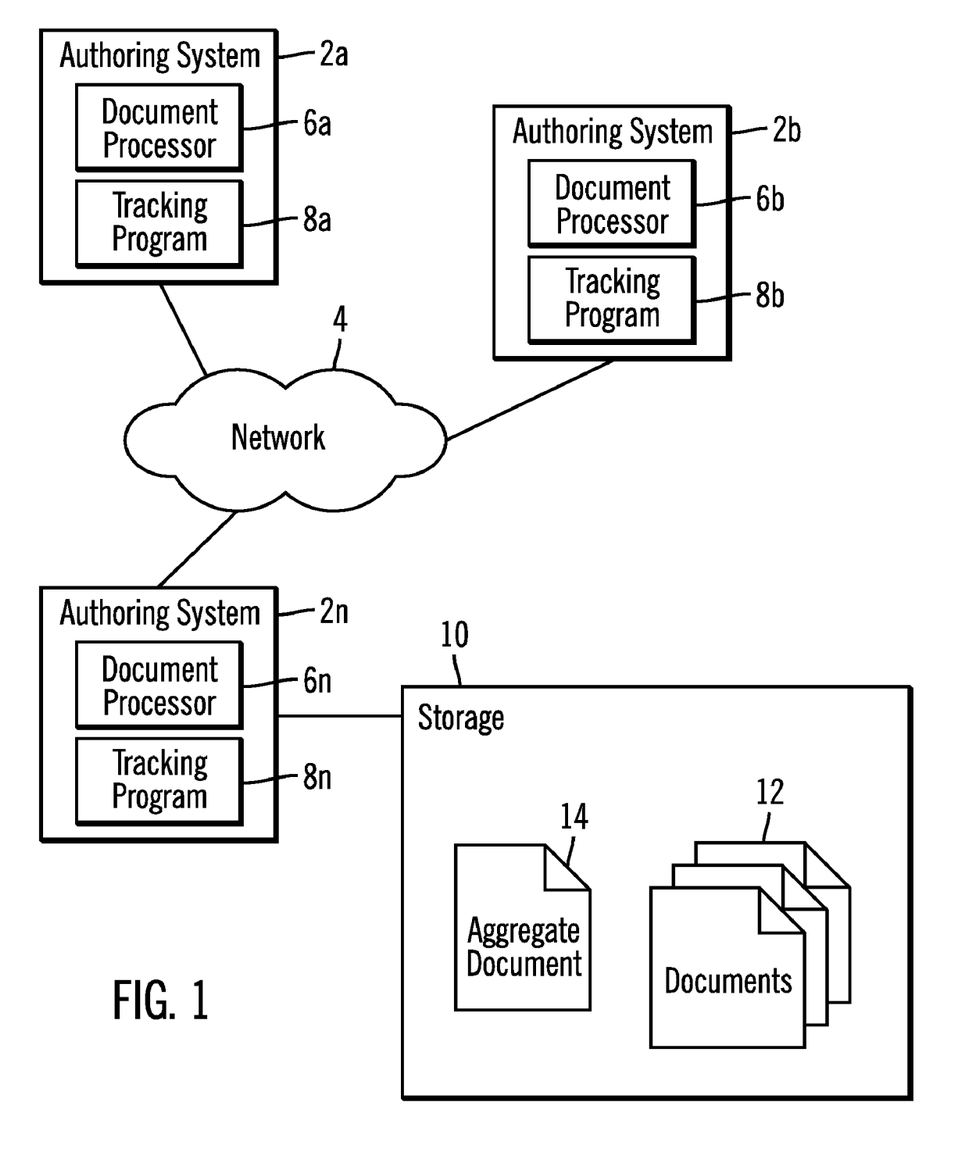
FIG. 1 illustrates an embodiment of a document authoring computing environment.

FIG. 1 illustrates an embodiment of a network computing environment for authoring documents. One or more authoring systems $2a, 2b \ldots 2n$ communicate over a network 4. Each authoring system $2a, 2b \ldots 2n$ includes a document processor program $6a, 6b \ldots 6n$ capable of creating and editing a document, such as a word processor program, spreadsheet program, software development tool, drawing/illustrator program, computer aided design (CAD) program, etc., and a tracking program $8a, 8b \ldots 8n$. The tracking program $8a, 8b \ldots 8n$ is used to compare and merge multiple documents to track changes among multiple documents edited by one or more of the authoring systems $2a, 2b \ldots 2n$. The tracking program $8a, 8b \ldots 8n$ may comprise a module of the document processor $6a, 6b \ldots 6n$ or a program separate from the document processor $6a, 6b \ldots 6n$.

Figure 10:
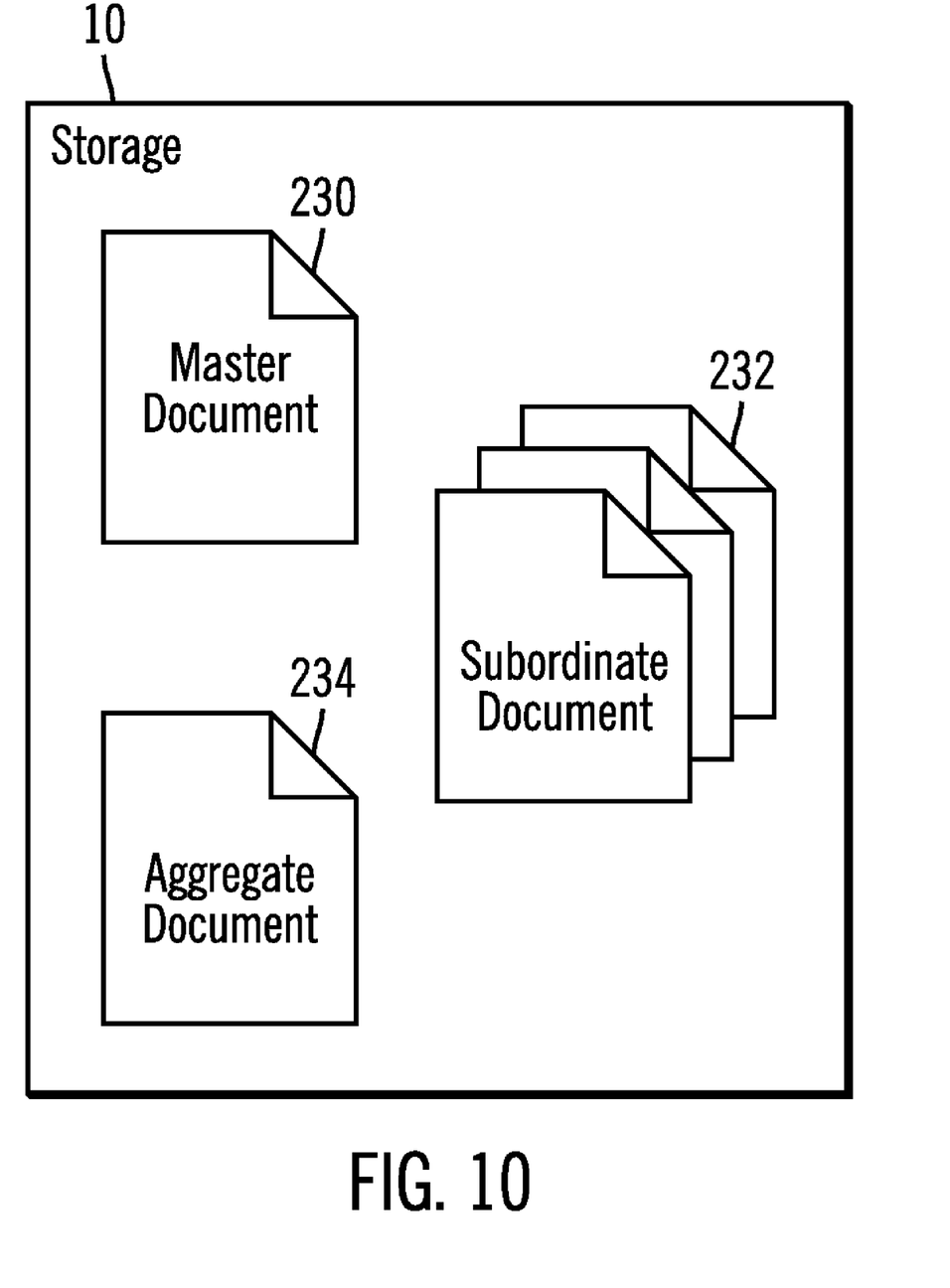
FIG. 10 illustrates an embodiment of a storage having master and subordinate documents.

Each authoring system $2a, 2b \ldots 2n$ may be coupled to a storage 10 (although FIG. 10 only shows authoring system $2n$ coupled to storage 10). The storage includes a plurality of documents 12. In one embodiment, one of the documents 12 may comprise a base document to which the content of the other documents is compared. In another embodiment, there may be no base document 12 to which the other documents 12 are compared. In the case of no base document, all the documents may be compared with each other. An aggregate document 12 comprises a document generated by a tracking program $6a, 6b \ldots 6n$ to merge the content from the different documents 12 and 14

The authoring systems $2a, 2b \ldots 2n$ may comprise suitable computational devices known in the art, such as servers, desktop computers, workstations, mainframes, hand held computing devices, telephony devices, etc. The storage 10 may comprise a storage system known in the art, such as a storage system including a plurality of storage devices, e.g., interconnected hard disk drives (a Redundant Array of Independent Disks (RAID), Just a Bunch of Disks (JBOD), Direct Access Storage Device (DASD), disks connected in a loop configuration (serial loop, Fibre Channel Arbitrated Loop), a single storage device (e.g., disk) a tape library, an optical library, a network attached storage (NAS), etc. The network 4 may comprise a Wide Area Network (WAN), Local Area Network (LAN), Storage Area Network (SAN), wireless network, the Internet, an Intranet, peer-to-peer network, etc.

Figure 2:
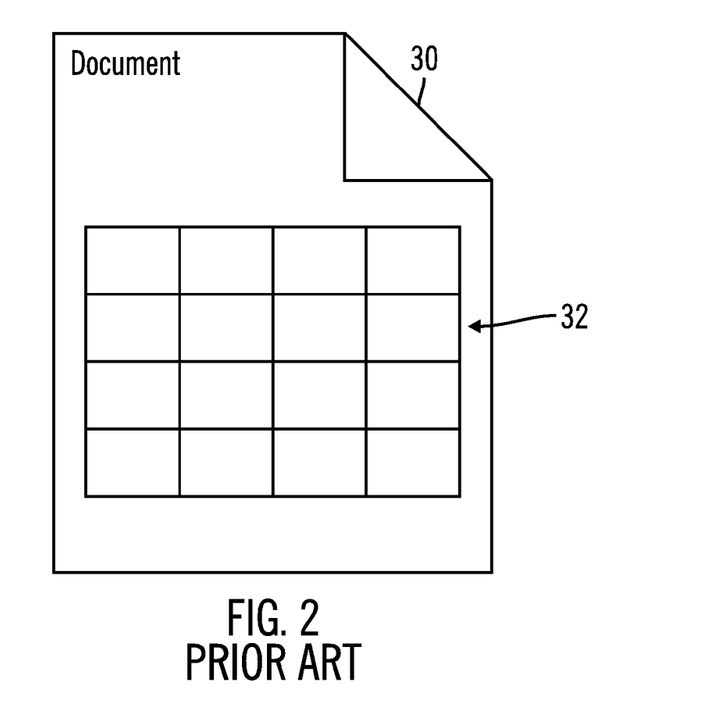
FIG. 2 illustrates an embodiment of a document structure known in the prior art.

FIG. 2 illustrates an embodiment of a document 30 structure known in the prior art, such as documents 12 and 14, that includes content element locations 32 capable of including content or indication of no content. For instance, if the document 30 is a spreadsheet, then the content element location may comprise a spreadsheet cell. If the document is a word processing document, the content element location may comprise a character position, word position, paragraph position, section position, etc. A word, paragraph or section position in a word processing document may be represented by multiple character positions. If the document comprises a graphics program, then the content element location may comprise a grid location on a page of the document. For any other type of document, the content element location may comprise any unit used to identify and locate content in the document.

Figure 3:
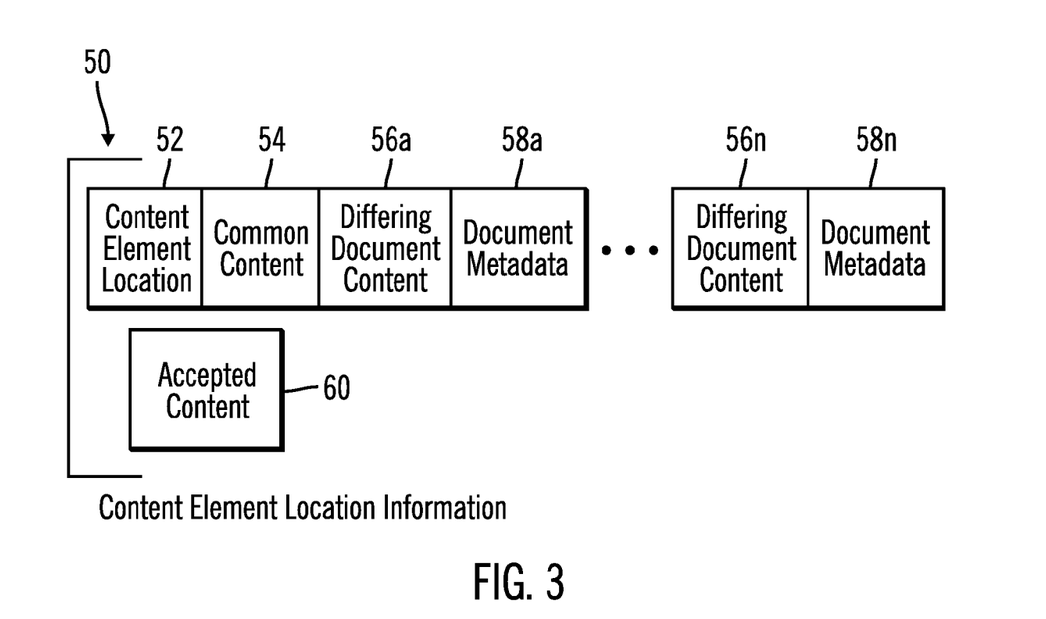
FIG. 3 illustrates an embodiment of content element location information maintained for content element locations in a document.

FIG. 3 illustrates an embodiment of content element location information 50 that is generated by the tracking program 8*a*, 8*b* . . . 8*n* for each content element location in the aggregate document 14, based on the documents 12 that are involved in the compare and merge operation resulting in the aggregate document 14. The content element location information 50 may be maintained in the aggregate document 14 for the content element locations 30 (FIG. 2) in the aggregate document 14 or maintained separately. The content element location information 50 includes the content element location 52, which is the location of the content; common content 54, which is content that is the same among all documents 12 being compared or if there is a base document, the common content 54 comprises the content for the content element location 52 in the base document; differing document content 56*a* . . . 56*n* comprising the content from documents 12 that provide different content for the content element location 52. If there is no base document, then the differing content 56*a* . . . 56*n* may comprise the content from each document involved in the comparison if all the documents 12 do not have the same content. If there is a base document, then the differing content 56*a* . . . 56*n* may comprise the content from each document 14 involved in the comparison against the base document that provides content for the content element location 52 differing from the content provided by the base document. The document metadata 58*a* . . . 58*n* provides information on the document 12 providing the differing content 56*a* . . . 56*n*, such as a file name, author, comments for the content, etc.; accepted content 60 indicates content the author using the tracking program 8*a*, 8*b* . . . 8*n* has selected to use for the content element location 52 when differing document content 56*a*, 56*b* . . . 56*n* is provided.

Figure 4:
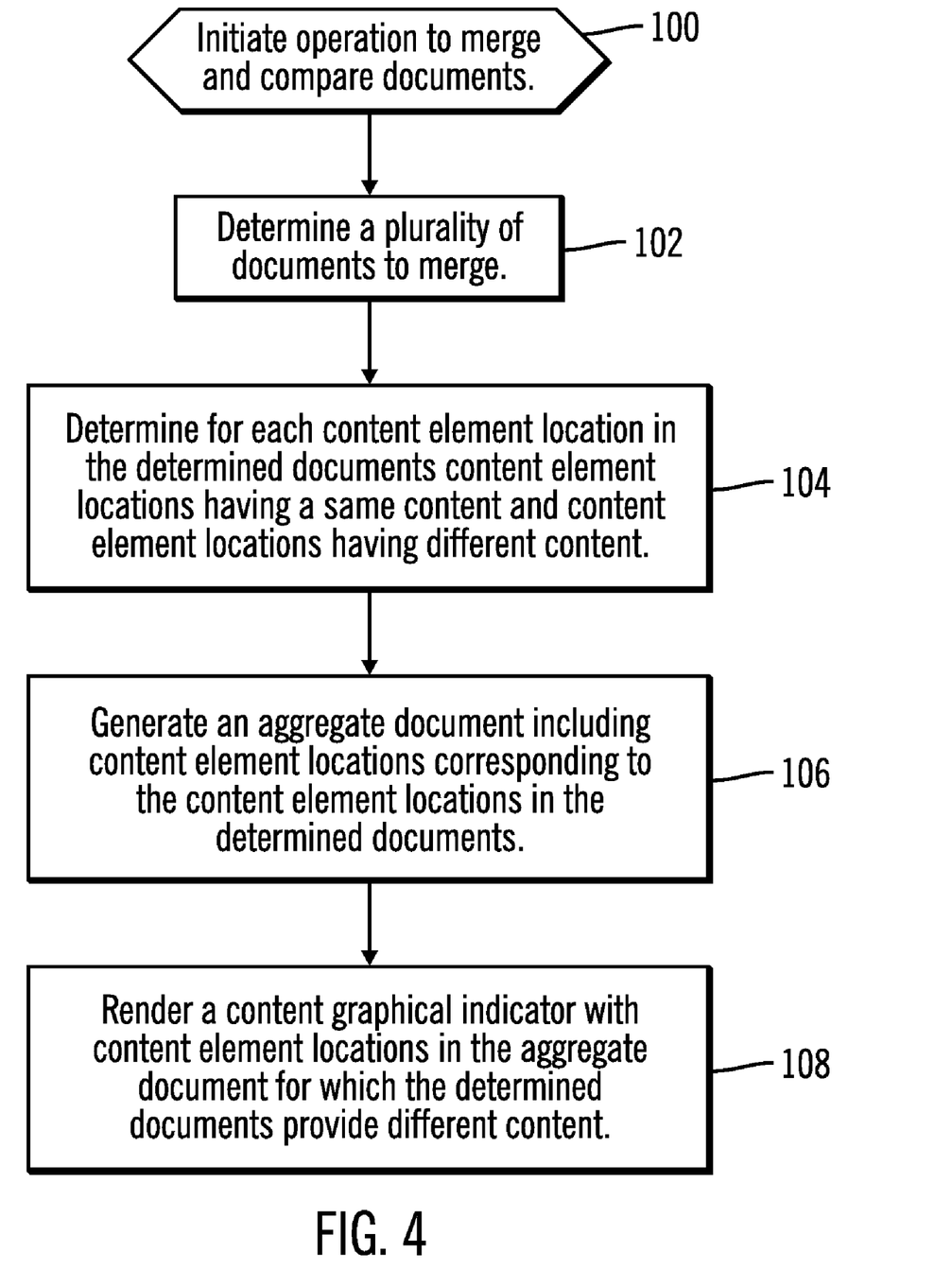
FIG. 4 illustrates an embodiment of operations performed to compare content from multiple documents.

FIG. 4 illustrates an embodiment of operations performed by the tracking program 8*a*, 8*b* . . . 8*n* to compare documents 12. The tracking program 8*a*, 8*b* . . . 8*n* may be invoked from within the document processor 6*a*, 6*b* . . . 6*n* or invoked outside of the document processor 6*a*, 6*b* . . . 6*n*. Upon being invoked (at block 100), the tracking program 8*a*, 8*b* . . . 8*n* determines (at block 102) a plurality of documents 12 to merge. The determination of documents to merge can either be automated (where the files to merge are indicated through a file name or other document tag technique) or user selected. A determination is then made (at block 104) for each content element location in the determined documents 14 of content element locations having a same content and content element locations having different content. The tracking program 8*a*, 8*b* . . . 8*n* generates (at block 106) an aggregate document 14 including content element locations 32 corresponding to the content element locations 32 in the determined documents having differing content such as corresponding cells, character position, word positions, sentence positions, grid positions, etc. The tracking program 8*a*, 8*b* . . . 8*n* may add information to the content element location information 50 (FIG. 3) for content element locations 32 on the documents providing different content for one of the content element locations in fields 56*a*, 58*b* . . . 56*n*, 58*n*. As mentioned, if there is no base document and all documents to merge provide the same content for a content element location, then that content is maintained in the common content 54. If there is a base document to which the determined documents are compared, the common content 54 may comprise the content of the base document for the content element location.

Figure 5:
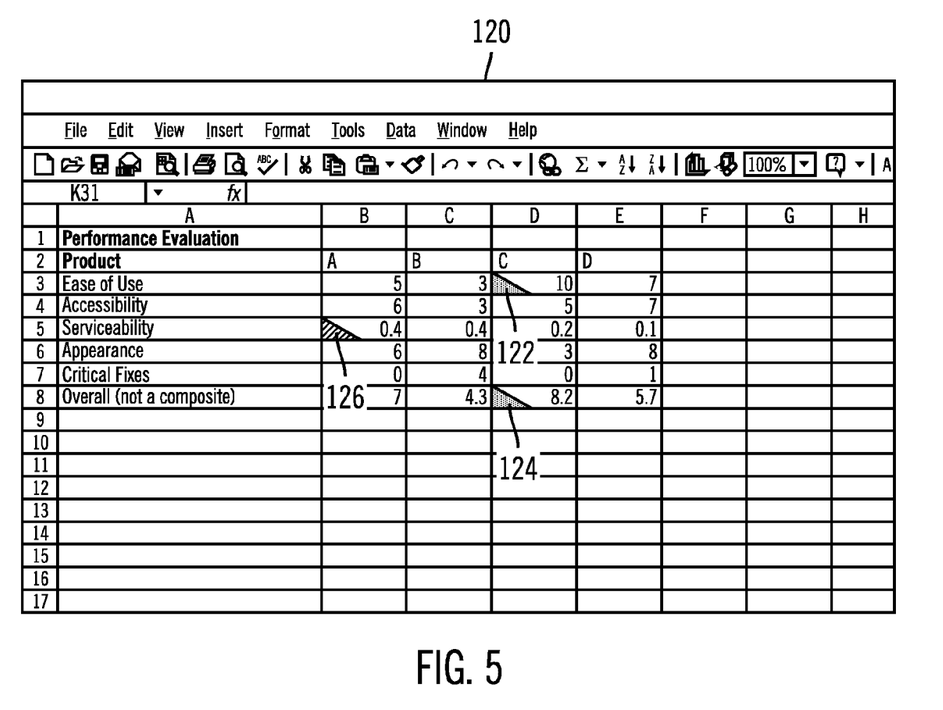
FIGS. 5, 8, and 9 illustrate embodiments of aggregate documents rendering graphical information for content element locations.

The tracking program 8*a*, 8*b* . . . 8*n* may render (at block 108) a content graphical indicator with content element locations in the aggregate document 14 for which the determined documents provide differing content. FIG. 5 provides an embodiment where the aggregate document 120 is a spreadsheet. Cells 122 and 124 have graphical indicators indicating that that the documents provide different content for that content element location or cell. Cell 126 has a different appearing graphical indicator from the indicator of cells 122 and 124 to indicate that the user has selected or accepted the content from one of the documents providing different content for that content element location or cell 126. Cells without any indicator may comprise cells with common content 54.

Figure 6:
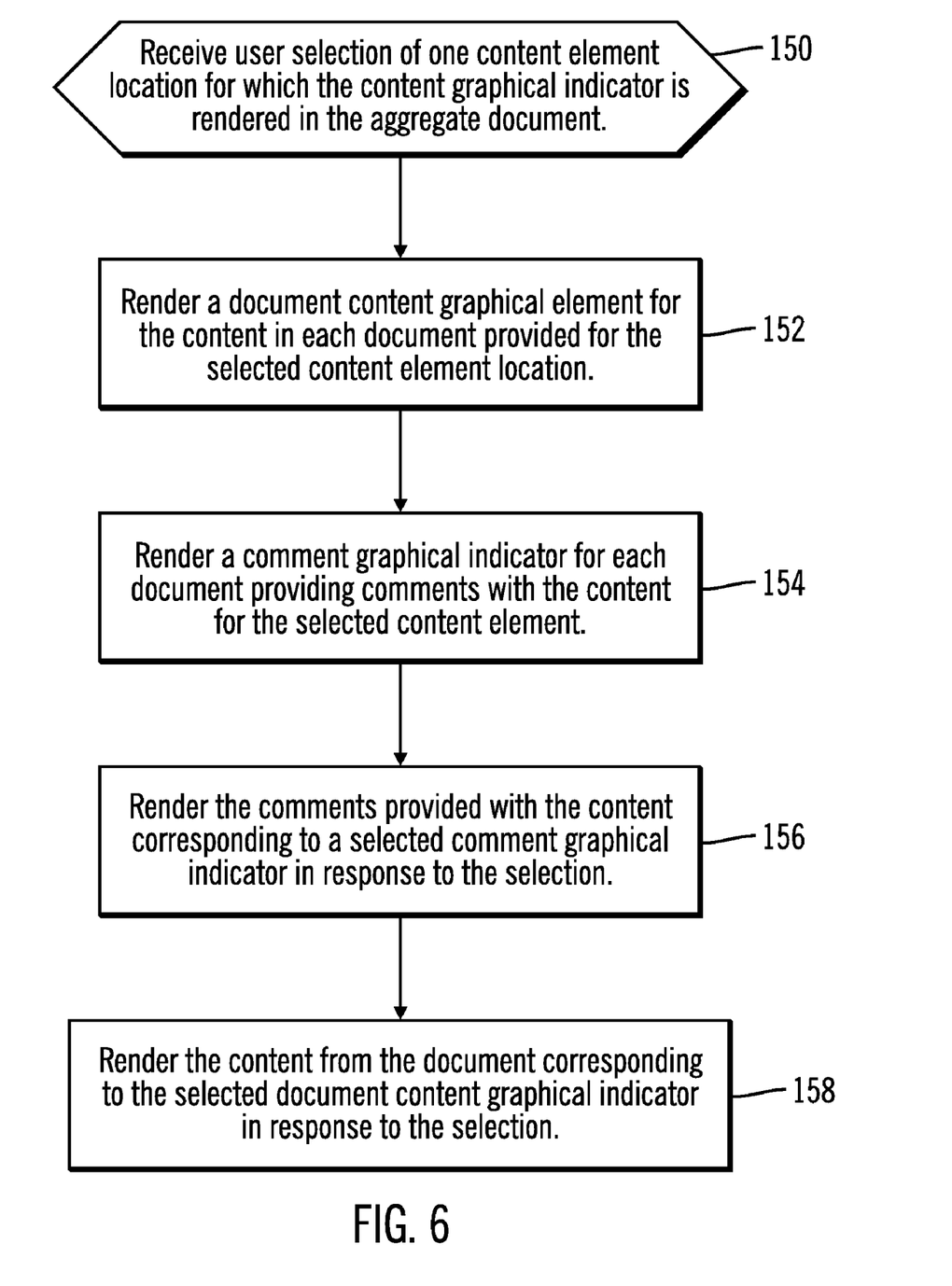
FIGS. 6 and 7 illustrate embodiments of operations performed to process user selections with respect to graphical information rendered for content element locations in the aggregate document.
Figure 8:
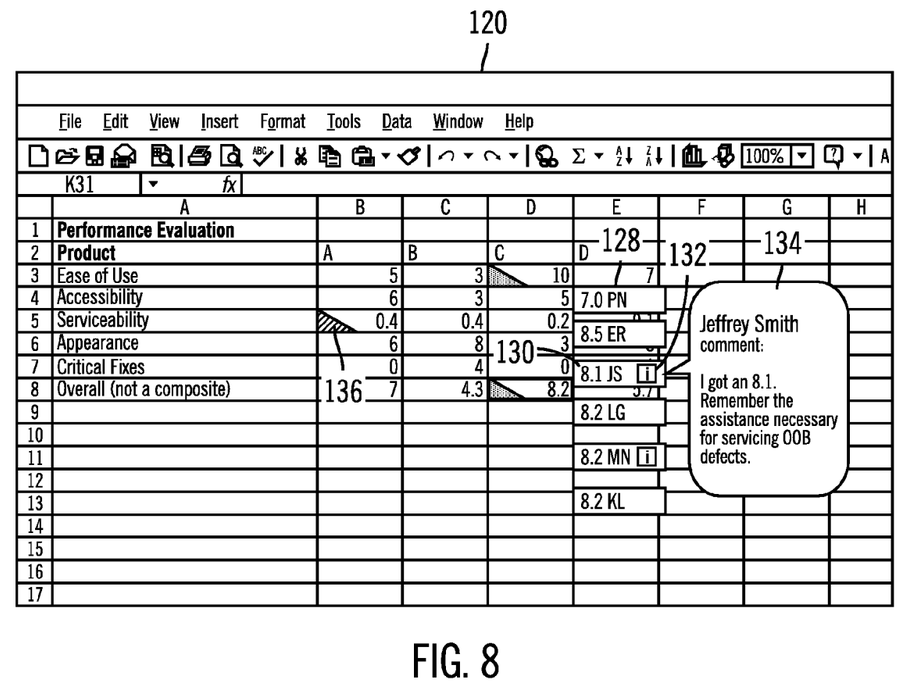

FIG. 6 illustrates an embodiment of operations performed by the tracking program 8*a*, 8*b* . . . 8*n* to process a user selection of one of the content element locations in the documents for which the documents provide differing content. Upon receiving (at block 150) user selection of one content element location for which the content graphical indicator is rendered in the aggregate document 14, such as selection of cells 122 or 124 in FIG. 5, the tracking program 8*a*, 8*b* . . . 8*n* renders (at block 152) a document content graphical element for the content in each document provided for the selected content element location. FIG. 8 illustrates an embodiment of the aggregate document 120 of FIG. 5 where the user has selected cell 124 (content element location) causing the rendering of a document content graphical element for each document providing content, which are shown as the graphical elements or boxes 128 and 130, where each box indicates the initials of a user that authored the document providing the differing content.

The tracking program 8*a*, 8*b* . . . 8*n* may further render (at block 154) a comment graphical indicator for each document providing comments with the content for the selected content element. For instance, with respect to the aggregate document 120 in FIG. 8, cell (content element location) 130 includes a comment graphical indicator in the form of information symbol ("i") 132 indicating that the differing content for the document includes user comments. The comments provided with the content corresponding to a selected comment graphical indicator are rendered (at block 156) in response to the selection of the comment graphical indicator 132. With respect to the aggregate document 120 spreadsheet in FIG. 8, a comment balloon 134 is rendered in response to the user selecting the information indicator 132. Comment information for differing content may be maintained in the document metadata 58*a* . . . 58*n* for the differing content 56*a* . . . 56*n*.

Figure 9:
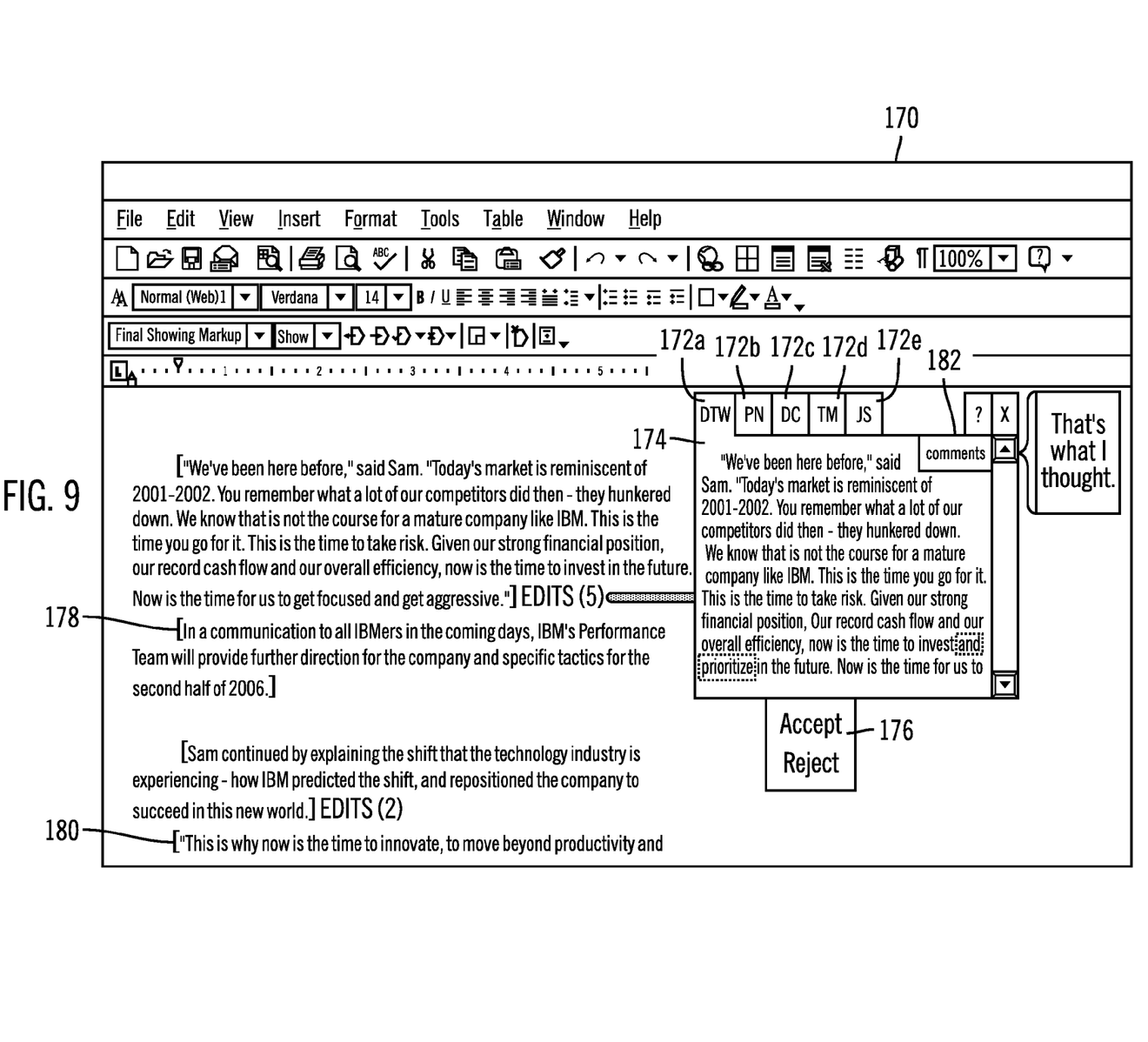

Further, the tracking program 8*a*, 8*b* . . . 8*n* may render (at block 158) the content from the document corresponding to the selected document content graphical indicator in response to the selection. FIG. 9 illustrates an embodiment where the aggregate document 170 comprises a word processing document. Document content graphical indicators 172*a*, 172*b*, 172*c*, 172*d*, 172*e*, including the author initials of the documents providing differing content 56*a* . . . 56*n*, may be selected to display the content 174 from the document corresponding to the selected content graphical indicator 172*a*.

Further, selection of the document content graphical indicators in FIG. 8, e.g., 128 and 130, would display the content 56a . . . 56n from the document corresponding to the selected indicator.

Figure 7:
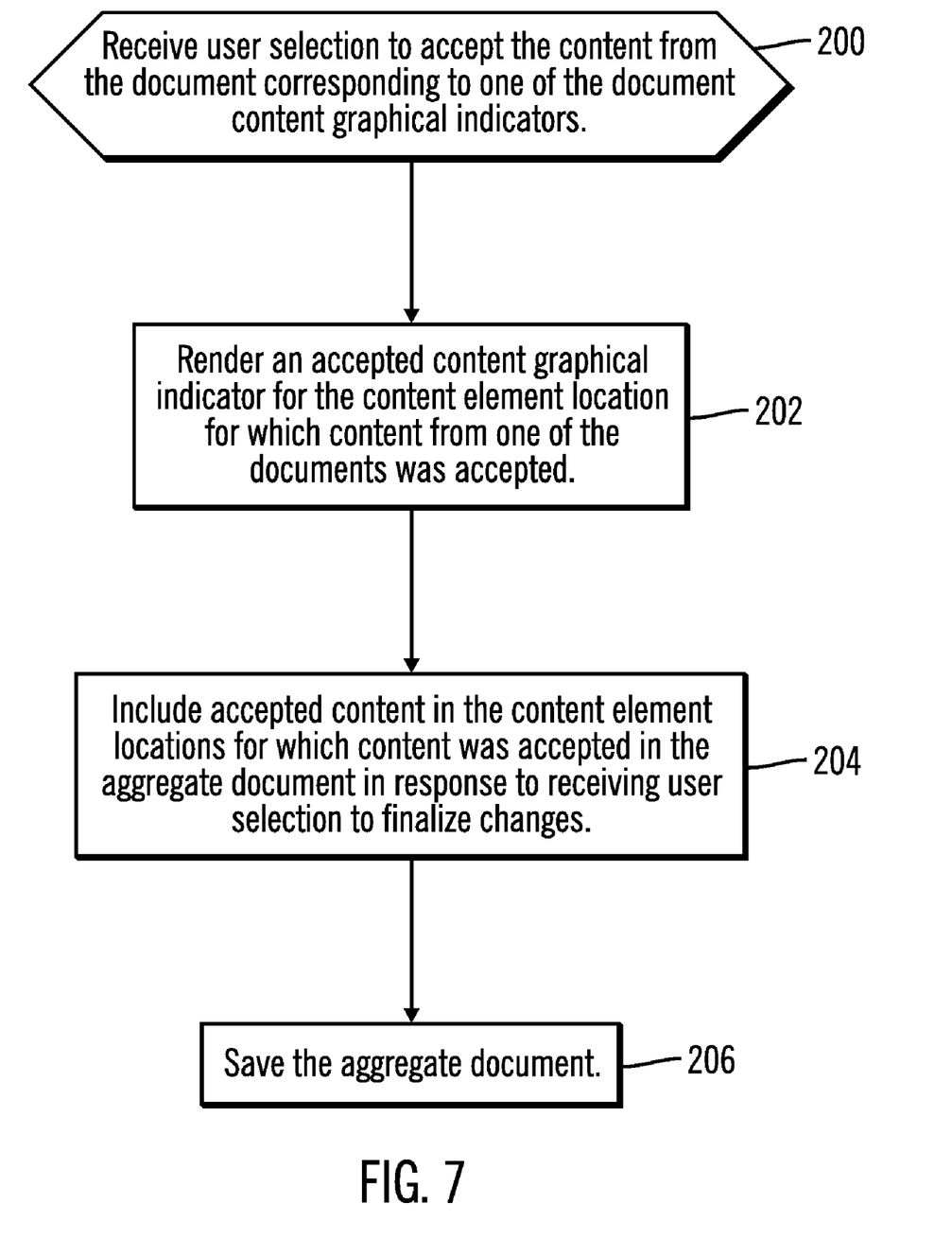

FIG. 7 illustrates an embodiment of operations performed by the tracking program 8a, 8b . . . 8n to accept content for a content element location. Upon receiving (at block 200) user selection to accept the content from the document corresponding to one of the document content graphical indicators, an accepted content graphical indicator is rendered (at block 202) for the content element location for which content from one of the documents was accepted. The accepted content is included (at block 204) in the content element locations for which content was accepted in the aggregate document 14 in response to receiving user selection to finalize changes, such as included in accepted content 60 (FIG. 3). With respect to FIG. 8, cell 136 in the aggregate spreadsheet 130 is displayed with a graphical indicator indicating that the user selected the content from one document providing differing content 56a . . . 56n for that selected content element location 52 to use for the document. FIG. 9 shows an acceptance menu item 176 the user may select to accept the displayed content 174 for the content element location corresponding to the selected document content graphical indicator 172a. Further, with respect to FIG. 9, certain brackets, such as brackets 178 and 180 may be displayed in a manner to indicate that content at a content element location, e.g., paragraphs, has been accepted in the document 170. The aggregate document 14 with the accepted content may then be finalized and saved (at block 206), in response to user selection, as a new version of the documents or replace the documents involved in the merge.

Yet further, the comments selectable element 182 may include an option to display comments from a plurality of users for a single content location at once and allow the user to define the size of content locations to be reviewed together (i.e. per tabbed box). For example with a word processing document a user might specify whether they want all edits combined in a tabbed box on a per sentence basis, or per paragraph basis. This could also be specified differently in real time, for example a user could right click on a word and select from several options with respect to content location size (word, sentence, paragraph, etc.). Edited elements (for example words within a sentence) could be identified where there are multiple conflicting edits. The tabbed box may also be capable of providing the user with options for how to accept edits, for example, accept all edits from a certain user in the selected content location or element therein (for example word or sentence within a paragraph), accept all edits (except multiple conflicting edits) in a content location, etc.

FIG. 10 illustrates an embodiment of the storage 10 having a master document 230, also known as a base document, and a plurality of subordinate documents 232, as well as an aggregate document 234. In one embodiment, the master document 230 may have a file name indicating a master status. A copy of the master document 230 may be distributed to different users of the authoring systems 2a, 2b . . . 2n, who may then modify their copy to produce subordinate documents 232 having a file name identifying the master and identifying them as a unique subordinate document. In one embodiment, the subordinate document 232 file name may identify the author of the subordinate document 232.

Figure 11:
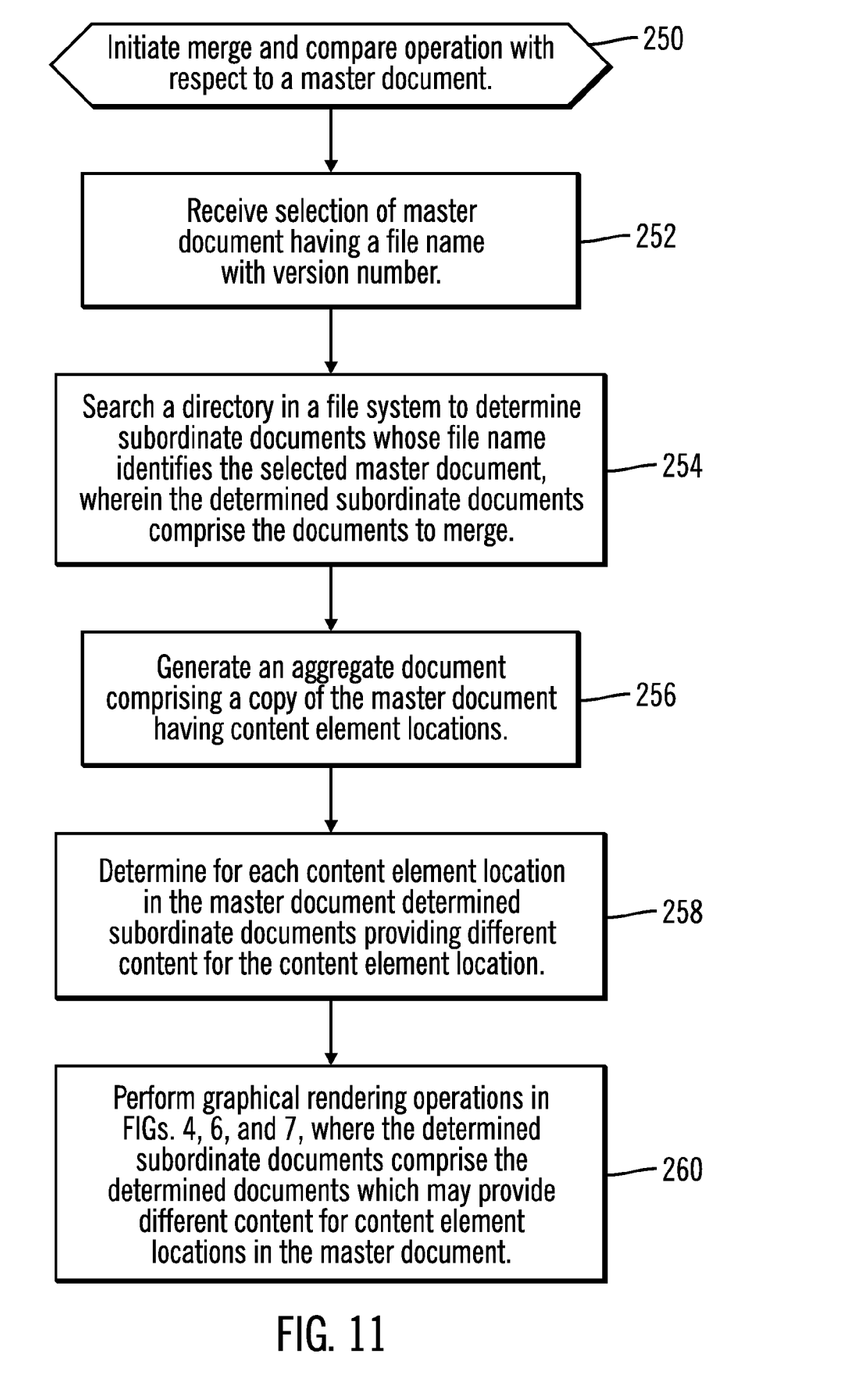
FIG. 11 illustrates an embodiment of operations to compare and merge a master document with multiple subordinate documents.

FIG. 11 illustrates an embodiment of operations performed by the tracking program 8a, 8b . . . 8n to compare and merge subordinate documents 232 with respect to a master document 230. Upon initiating (at block 250) the merge and compare operation, the tracking program 8a, 8b . . . 8n receives user selection (at block 252) of a master document 230 having a file name with version number. The tracking program 8a, 8b . . . 8n may then search (at block 254) a directory in a file system to determine subordinate documents 232 whose file name identifies the selected master document 230, wherein the determined subordinate documents 232 comprise the documents to merge. In an alternative embodiment, tag or metadata information in the document may identify the master document 230 to which the subordinate document 232 is related. In one embodiment, the determined subordinate documents 232 may be automatically merged into the master document 230. In a further embodiment, the determined documents may be presented to the user via a user interface to enable the user to select "candidates" for merging. This surfacing or presentation of candidate documents for selection allows the user to only select tagged documents that are particular to a certain group, project, or team. This saves the user from having to select individual documents saved on a workstation from possibly hundreds of similar documents. Also, by "saving as master" after the first iteration, further changes by co-authors would create a new tag, thus saving the primary author from having to sift through and find the most recent "changed" documents.

An aggregate document 234 is generated (at block 256) comprising a copy of the selected master document 230 having content element locations 30. The tracking program 8a, 8b . . . 8n determines (at block 258) for each content element location in the master document 230 those determined subordinate documents 232 providing differing content for that content element location. The tracking program 8a, 8b . . . 8n may further perform (at block 260) the graphical rendering operations in FIGS. 4, 6, and 7, where the determined subordinate documents 232 comprise the determined documents which may provide different content for content element locations in the master document 234.

Described embodiments provide techniques to merge multiple documents and provide graphical user interface (GUI) elements and indicators to enable the user to view the content different documents provide for a document and select among the different content to use for document content element locations. The described embodiments provide techniques to allow an author to efficiently view and accept content for a document provided by different authors who provided modifications for a base or master document.

ADDITIONAL EMBODIMENT DETAILS

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

Figure 12:
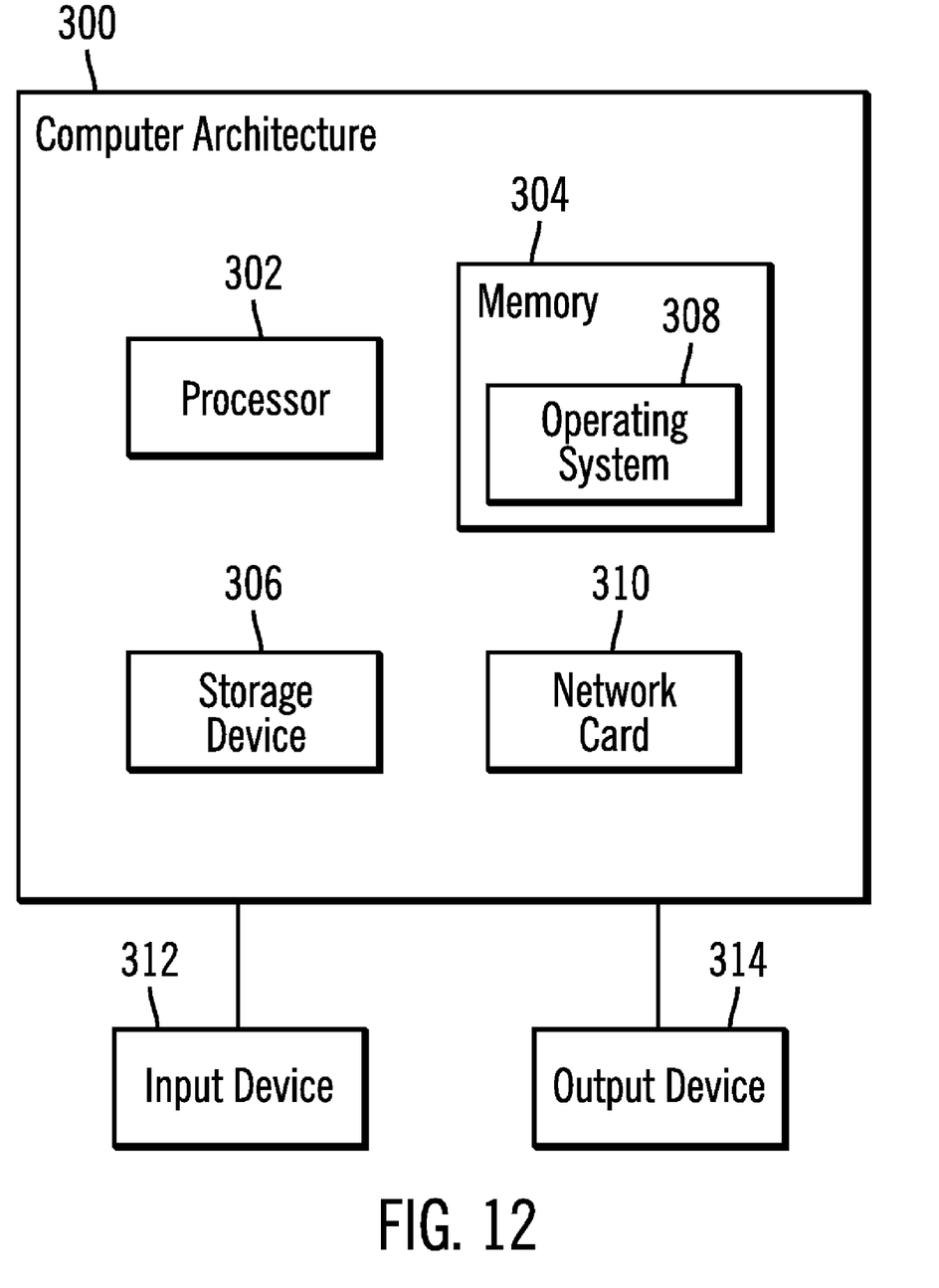
FIG. 12 illustrates an embodiment of a computer architecture that may be used with the authoring systems in FIG. 1.

FIG. 12 illustrates one implementation of a computer architecture 300 that may be implemented at the authoring systems 2a, 2b . . . 2n. The architecture 300 may include a processor 302 (e.g., a microprocessor), a memory 304 (e.g., a volatile memory device), and storage 306 (e.g., a non-volatile storage, such as magnetic disk drives, optical disk drives, a tape drive, etc.). The storage 306 may comprise an internal storage device or an attached or network accessible storage. Programs, including an operating system 308, device drivers and application programs, in the storage 306 are loaded into the memory 304 and executed by the processor 302 in a manner known in the art. The architecture further includes a network card 310 to enable communication with a network. An input device 312 is used to provide user input to the processor 302, and may include a keyboard, mouse, pen-stylus, microphone, touch sensitive display screen, or any other activation or input mechanism known in the art. An output device 314 is capable of rendering information transmitted from the processor 302, or other component, such as a display monitor, printer, storage, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

The variable "n" when used to represent a variable number of an element may indicate any number of instances of the element, and may indicate different integer numbers when used with different elements.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 4, 6, 7, and 11 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An article of manufacture including code capable of causing operations to be performed, the operations comprising:

receiving input identifying a plurality of merge documents to merge, wherein each merge document includes content element locations of content, wherein the merge documents have corresponding content element locations at same locations in the merge documents, wherein content in the content element locations comprises user content or indication that the content element location is empty;

determining in the identified merge documents, the corresponding content element locations in the merge documents having a same content and corresponding content element locations in at least two of the merge documents having different content;

generating an aggregate document including content element locations for the determined corresponding content element locations in the merge documents;

rendering a content graphical indicator with each content element location in the aggregate document for which at least two of the merge documents provide different content for the corresponding content element location, wherein a plurality of content graphical indicators are rendered in the aggregate document for content element locations for which at least two of the merge documents provide different content for the corresponding content element locations;

receiving user selection of one content element location in the aggregate document for which the graphical indicator is rendered; and rendering user selectable information for the different content the plurality of the merge documents provide for the user selected content element location.

2. The article of manufacture of claim 1, wherein the content graphical indicator comprises an unaccepted content graphical indicator, wherein the operations further comprise:

receiving user selection to accept the content for which information is rendered for the selected content element location; and rendering an accepted content graphical indicator for the selected content element location having the selected content.

3. The article of manufacture of claim 2, wherein the operations further comprise:

receiving user selection to finalize changes;

including accepted content in each content element location in the aggregate document for which content associated with one instance of the rendered information was accepted in response to the user selection to finalize the changes; and saving the aggregate document.

4. The article of manufacture of claim 1, wherein one merge document provides comments on the content included with one content element location, wherein rendering information on the content for the selected content element location further comprises:

rendering a comment graphical indicator with the rendered information for each merge document providing content for the selected content element location;

receiving selection of one comment graphical indicator; and rendering the comments provided with the content in one of the merge documents in response to receiving selection of the comment graphical indicator generated for the comments in the merge document.

5. The article of manufacture of claim 1, wherein a plurality of the merge documents include content from at least one user and wherein the rendered information for the content in the merge documents for content element locations indicates the user that created the merge document.

6. The article of manufacture of claim 1, wherein the merge documents comprise at least one subordinate document to a master document, wherein each subordinate document comprises a copy of the master document, wherein at least one subordinate document includes changes to at least one content element location from the master document, and wherein the generated aggregate document comprises a copy of the master document.

7. The article of manufacture of claim 6, wherein the master document includes information identifying a version number of the master document and wherein each subordinate document includes information identifying the master document for which the subordinate document provides changes.

8. The article of manufacture of claim 7, wherein determining the documents to merge comprises:

receiving selection of one master document;

searching a directory in a file system to identify subordinate documents which are revised versions of the selected master document, wherein the merge documents comprise at least two subordinate documents.

9. The article of manufacture of claim 8, wherein the operations further comprise:

rendering information on the identified subordinate documents to enable user selection of a user approved set of the identified subordinate documents comprising at least one of the identified subordinate documents, wherein the merge documents comprise the user approved set of subordinate documents.

10. The article of manufacture of claim 1, wherein rendering information for the content in the plurality of the merge documents provided for the selected content element location further comprises:

rendering a document content graphical element for the content in each merge document provided for the selected content element location, wherein content graphical elements are rendered for multiple merge documents;

receiving selection of one rendered document content graphical element for the content from one merge document;

rendering the content from the merge document corresponding to the selected document content graphical element.

11. An article of manufacture including code capable of causing operations to be performed, the operations comprising:

receiving selection of one master document;

searching a directory in a file system to identify subordinate documents which are revised versions of the selected master document, wherein each subordinate document and the master document includes content element locations of content, wherein the documents have corresponding content element locations at same locations in the documents, wherein content in the content element locations comprises user content or indication that the content element location is empty, wherein each subordinate document comprises a copy of the master document, wherein at least one subordinate document includes changes to at least one content element location from the master document;

rendering information on the identified subordinate documents to enable user selection of a user approved set of the identified subordinate documents comprising at least one of the identified subordinate documents;

determining in the user approved set of subordinate documents, the corresponding content element locations in the subordinate documents having a same content and corresponding content element locations in at least one of the user approved set of the subordinate documents having different content than the master document;

generating an aggregate document that is a copy of the master document;

rendering a content graphical indicator with each content element location in the aggregate document for which at least one of the determined user approved set of subordinate documents provide different content than the master document for the corresponding content element location, wherein a plurality of content graphical indicators are rendered in the aggregate document for content element locations for which at least one of the determined subordinate documents provide different content than the master document for the corresponding content element locations;

receiving user selection of one content element location in the aggregate document for which the graphical indicator is rendered; and rendering user selectable information for the different content the user approved set of subordinate documents provide for the user selected content element location.

12. A system, comprising:

a storage including a plurality of documents to merge, wherein each document includes content element locations, wherein content in the content element locations comprises user content or indication that the content element location is empty;

a processor;

a computer readable medium including code executed by the processor to perform operations, the operations comprising:

receiving input identifying a plurality of merge documents to merge, wherein each merge document includes content element locations of content, wherein the merge documents have corresponding content element locations at same locations in the merge documents, wherein content in the content element locations comprises user content or indication that the content element location is empty;

determining in the identified merge documents, the corresponding content element locations in the merge documents having a same content and corresponding content element locations in at least two of the merge documents having different content;

generating an aggregate document including content element locations for the determined corresponding content element locations in the merge documents;

rendering a content graphical indicator with each content element location in the aggregate document for which at least two of the merge documents provide different content for the corresponding content element location, wherein a plurality of content graphical indicators are rendered in the aggregate document for content element locations for which at least two of the merge documents provide different content for the corresponding content element locations;

receiving user selection of one content element location in the aggregate document for which the graphical indicator is rendered; and rendering user selectable information for the different content the plurality of the merge documents provide for the user selected content element location.

13. The system of claim 12, wherein the content graphical indicator comprises an unaccepted content graphical indicator, wherein the operations further comprise:

receiving user selection to accept the content for which information is rendered for the selected content element location; and rendering an accepted content graphical indicator for the selected content element location having the selected content.

14. The system of claim 12, wherein the merge documents comprise at least one subordinate document to a master document, wherein each subordinate document comprises a copy of the master document, wherein at least one subordinate document includes changes to at least one content element location from the master document, and wherein the generated aggregate document comprises a copy of the master document.

15. The system of claim 14, wherein the master document includes information identifying a version number of the master document and wherein each subordinate document includes information identifying the master document for which the subordinate document provides changes.

16. The system of claim 14, wherein determining the documents to merge comprises:

receiving selection of one master document; and searching a directory in a file system to identify subordinate documents which are revised versions of the selected master document, wherein the merge documents comprise at least two subordinate documents.

17. A method, comprising:

receiving input identifying a plurality of merge documents to merge, wherein each merge document includes content element locations of content, wherein the merge documents have corresponding content element locations at same locations in the merge documents, wherein content in the content element locations comprises user content or indication that the content element location is empty;

determining in the identified merge documents, the corresponding content element locations in the merge documents having a same content and corresponding content element locations in at least two of the merge documents having different content;

generating an aggregate document including content element locations for the determined corresponding content element locations in the merge documents;

rendering a content graphical indicator with each content element location in the aggregate document for which at least two of the merge documents provide different content for the corresponding content element location, wherein a plurality of content graphical indicators are rendered in the aggregate document for content element locations for which at least two of the merge documents provide different content for the corresponding content element locations;

receiving user selection of one content element location in the aggregate document for which the graphical indicator is rendered; and rendering user selectable information for the different content the plurality of the merge documents provide for the user selected content element location.

18. The method of claim 17, wherein the content graphical indicator comprises an unaccepted content graphical indicator, wherein the operations further comprise:

receiving user selection to accept the content for which information is rendered for the selected content element location; and rendering an accepted content graphical indicator for the selected content element location having the selected content.

19. The method of claim 17, wherein the identified merge documents comprise at least one subordinate document to a master document, wherein each subordinate document comprises a copy of the master document, wherein at least one subordinate document includes changes to at least one content element location from the master document, and wherein the generated aggregate document comprises a copy of the master document.

20. The method of claim 19, wherein the master document includes information identifying a version number of the master document and wherein each subordinate document includes information identifying the master document for which the subordinate document provides changes.

21. The article of manufacture of claim 1, wherein rendering the user selectable information for the selected content element location for which the graphical indicator is rendered comprises:

rendering in the aggregate document a user selectable document content graphical element for the content in each document providing different content for the user selected content element location.

* * * * *